Patented Oct. 27, 1953

2,657,202

UNITED STATES PATENT OFFICE 2,657,202

AZO DYESTUFFS

Eduard Moser, Basel, Switzerland, assignor to Ciba Limited, a Swiss firm

No Drawing. Application April 8, 1949, Serial No. 86,401. In Switzerland April 16, 1948

6 Claims. (Cl. 260—158)

It is known that there are relatively few dyestuffs which yield a pure greenish yellow tint, and it has therefore been necessary to use dyestuffs yielding such tints, notwithstanding that their dyeing properties are not wholly satisfactory.

According to the present invention azo-dyestuffs having especially valuable properties are made by coupling diazotized dehydrothio-paratoluidine disulfonic acid, which contains a sulfonic acid group in each benzene nucleus and of which one sulfonic acid group is in ortho-position to the diazo-group, with the acetoacetyl-compound of a 1-amino-2-alkoxy-4-halogen-5-alkyl-benzene.

The dehydrothio-para-toluidine disulfonic acid used as starting material can be obtained in accordance with U. S. Patent No. 1,159,386 either by sulfonating with fuming sulfuric acid the dehydrothio-para-toluidine-monosulfonic acid obtainable by baking the acid sulfate of dehydrothio-para-toluidine, or by baking the acid sulfate of the dehydrothio-para-toluidine-monosulfonic acid obtainable by sulfonating dehydrothio-paratoluidine with fuming sulfuric acid. According to German Patent No. 281,048 both methods lead to the same disulfonic acid. It corresponds to the formula

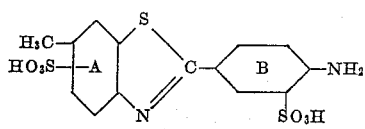

in which the position of the sulfonic acid group in the nucleus A has not been accurately determined.

The acetoacetyl-aminobenzenes used as coupling components may be derived, for example, from 1-amino-2-alkoxy-4-halogen-5-alkyl-benzenes, which contain fluorine or bromine, and advantageously chlorine, as the halogen. The alkoxy group in the 2-position advantageously contains only a few, for example, at most 4, carbon atoms. The alkoxy group may be a butyloxy or a propyloxy group. However, it is of advantage to use the 2-ethoxy- or preferably the 2-methoxy-compound. The alkyl group in the 5-position of the benzene residue is, for example, an alkyl group containing only a few carbon atoms, such as a butyl, propyl, isopropyl or ethyl group, and advantageously a methyl group.

The diazotization of the dehydrothiotoluidine disulfonic acid may be carried out in known manner, for example by means of hydrochloric acid and sodium nitrite. Coupling with the aforesaid acetoacetyl-compounds is advantageously conducted in a weakly acid, for example, acetic acid, to neutral or weakly alkaline medium. The dyestuff so obtained is worked up in the usual manner.

The dyestuffs of the invention correspond to the general formula

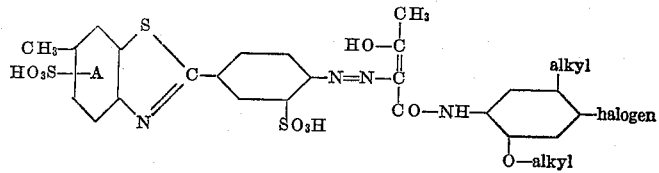

in which the halogen is advantageously fluorine or bromine, but especially chlorine, and each alkyl group advantageously contains only a few carbon atoms, the alkyl group being preferably a methyl group and the —O-alkyl group being preferably a methoxy group. The dyestuffs can be used for printing and especially for dyeing a very wide variety of fibers such as wool and leather, but especially cellulose fibers such as cotton and artificial silk or staple fibers of regenerated cellulose. Pure, greenish yellow dyeings are obtained with the new dyestuff on cellulose fibers. As compared with the similar known dyestuffs described in U. S. Pat. No. 1,159,386 and the corresponding German Patent No. 293,-333 which, too, yield greenish yellow dyeings, the dyestuffs of the invention, as a rule, are distinguished by possessing an improved absorptive capacity and fastness to washing and also better dyeing strength. With regard to fastness to light they fulfill the normal requirements.

The following examples illustrate the invention, the parts and percentages being by weight unless otherwise stated and the relationship of parts by weight to parts by volume being the same as that of the kilogram to the liter:

*Example 1*

25.6 parts of 1-acetoacetylamino-2-methoxy-4-chloro-5-methylbenzene are dissolved in 250 parts of water and 13.5 parts of sodium hydroxide solution of 30 per cent. strength, and 20 parts of crystalline sodium acetate are added. Into the clear solution is poured in a thin stream, while stirring well at room temperature a diazo-solution prepared in known manner from 40 parts of dehydrothio-para-toluidine disulfonic acid (which has been obtained by baking dehydrothio-para-toluidine monosulfonic acid) by means of 25 parts by volume of hydrochloric acid of 30 per cent. strength and the necessary quantity of nitrite. The whole is stirred for 4 hours longer. There is then introduced dropwise an aqueous solution of 10 per cent. strength of anhydrous sodium carbonate until the dyestuff suspension has a reaction alkaline to Brilliant Yellow, and the whole is then heated to 50° C. The dyestuff, which in its free acid state corresponds to the formula

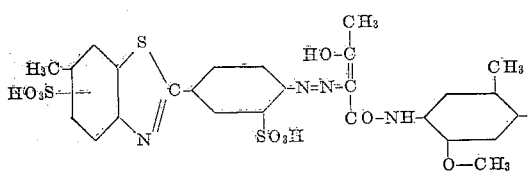

is salted out completely by means of a little sodium chloride, separated by filtration and dried. It is a yellow powder which dissolves in water and in dilute caustic soda solution with a yellow coloration and in concentrated sulfuric acid with an orange coloration. Direct dyeings produced with the dyestuff on cotton or regenerated cellulose are greenish yellow.

By using, instead of 1-acetoacetylamino-2-methoxy-4-chloro-5-methylbenzene, 26.95 parts of 1-acetoacetylamino - 2 - ethoxy - 4 - chloro-5-methylbenzene and otherwise proceeding in the manner described above, there is obtained a dyestuff which in its free acid state corresponds to the formula

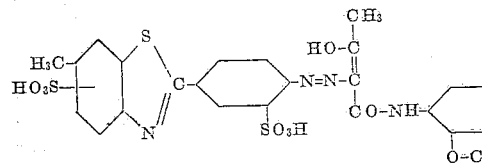

which dyes cotton yellow tints of a slightly less greenish shade and possesses an even better absorptive capacity. 1-acetoacetylamino-2-ethoxy - 4 - chloro - 5 - methylbenzene (melting at 133–137° C.) is obtained, for example by condensing ethyl acetoacetate or diketene with 1-amino - 2 - ethoxy - 4 - chloro - 5 - methylbenzene in chlorobenzene in the presence of triethanolamine. 1 - amino - 2 - ethoxy - 4 - chloro-5-methylbenzene may be prepared from 1-formylamino-2-ethoxy-5-methylbenzene by the action of chlorine followed by hydrolysis. It melts at 64.4–65° C.

By using 30 parts of 1-acetoacetylamino-2-methoxy-4-bromo-5-methylbenzene (obtained by condensing ethyl acetoacetate with 1-amino-2-methoxy-4-bromo-5-methylbenzene, and melting at 98–99° C.) there is obtained a dyestuff which in its free acid state corresponds to the formula

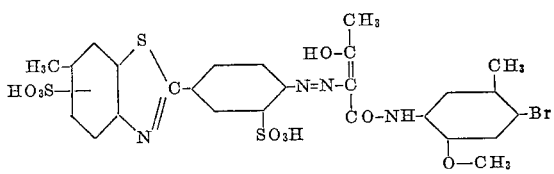

and which dyes cotton tints of a somewhat less greenish shade than the dyestuff obtainable as described in the first paragraph of this example and has about the same good absorptive capacity.

By starting from 31.4 parts of 1-acetoacetyl-amino-2-ethoxy-4-bromo-5-methylbenzene there is obtained a dyestuff which dyes cotton in slightly less greenish yellow tints and has a somewhat better absorptive capacity than the dyestuff obtainable as described in the first paragraph of this example. 1-acetoacetylamino-2-ethoxy-4-bromo-5-methylbenzene melting at 146° C. is obtained, for example, by condensing ethyl acetoacetate or diketene with 1-amino-2-ethoxy-4-bromo-5-methyl-benzene. 1-amino-2-ethoxy-4-bromo-5-methylbenzene can be obtained from 1-formylamino-2-ethoxy-5-methylbenzene by the action of bromine followed by hydrolysis. It melts at 64.5–65° C.

*Example 2*

100 parts of cotton are entered into a dyebath at 50° C. containing in 3000 parts of water 0.5 part of the dyestuff obtained as described in the first paragraph of Example 1 and 4 parts of anhydrous sodium carbonate. The temperature is raised to 90° C. in the course of ½ hour and 60 parts of crystalline sodium sulfate are added. Dyeing is carried on for 1 hour at 90–95° C. and the cotton is dyed a pure greenish yellow tint.

What is claimed is:
1. An azo-dyestuff of the formula

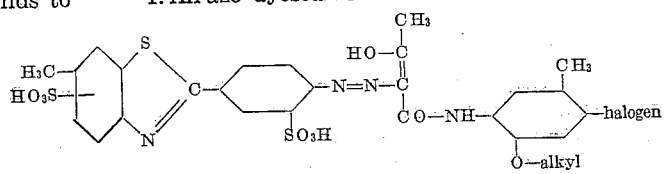

wherein the alkyl group contains at most 2 carbon atoms and the halogen is a member selected from the group consisting of chlorine and bromine.

2. An azo-dyestuff of the formula

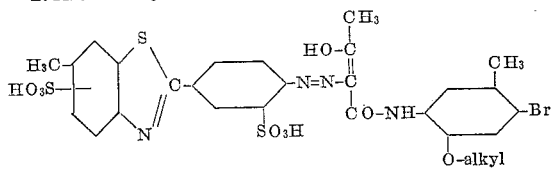

wherein the alkyl group contains at most 2 carbon atoms.

3. An azo-dyestuff of the formula

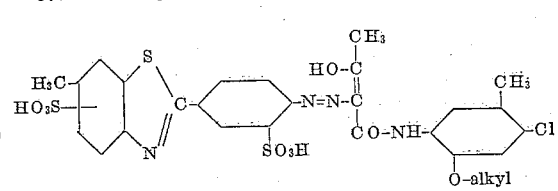

wherein the alkyl group contains at most 2 carbon atoms.

4. The azo-dystuff of the formula
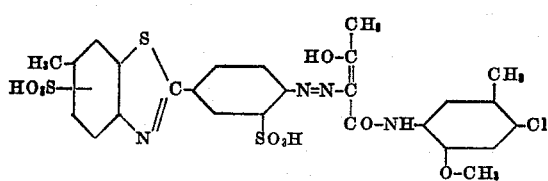
5. The azo-dyestuff of the formula
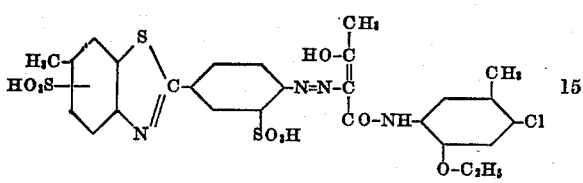
6. The azo-dyestuff of the formula
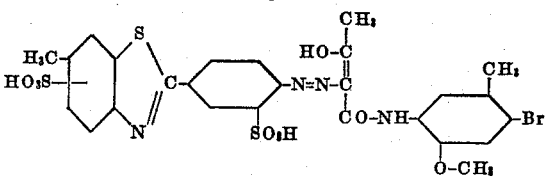
EDUARD MOSER.
References Cited in the file of this patent
UNITED STATES PATENTS
| Number | Name | Date |
| --- | --- | --- |
| 1,159,386 | Huismann | Nov. 9, 1915 |
| 2,030,327 | Schrader et al. | Feb. 11, 1936 |
FOREIGN PATENTS
| Number | Country | Date |
| --- | --- | --- |
| 293,333 | Germany | Jan. 22, 1914 |
| 883,982 | France | Apr. 5, 1943 |